(12) United States Patent
Hickey et al.

(10) Patent No.: US 6,505,891 B1
(45) Date of Patent: Jan. 14, 2003

(54) END DUMP FIFTH WHEEL TRAILER

(76) Inventors: Robert L. Hickey, 219 Belvedere P.O. Box 258, Charlevoix, MI (US) 49720; Jeffery Blair Shoopman, 2885 Schaeffner St., Saginaw, MI (US) 48604

( * ) Notice: Subject to any disclaimer, the term of this patent is extended or adjusted under 35 U.S.C. 154(b) by 0 days.

(21) Appl. No.: 09/899,342

(22) Filed: Jul. 5, 2001

(51) Int. Cl.[7] .................................................. B60P 1/18
(52) U.S. Cl. ............................... 298/27 AE; 298/20 A; 298/22 R
(58) Field of Search ............................ 298/20 A, 22 R, 298/22 AE, 17 R; 280/433

(56) References Cited

U.S. PATENT DOCUMENTS

| | | | |
|---|---|---|---|
| 3,111,346 A | * | 11/1963 | Harbers et al. |
| 3,459,451 A | | 8/1969 | Hoy |
| 3,640,578 A | | 2/1972 | Finney |
| 4,046,423 A | | 9/1977 | Ordonez |
| 4,382,632 A | | 5/1983 | Pitts |
| 5,184,872 A | * | 2/1993 | Larochelle et al. ..... 298/22 AE |
| 5,354,165 A | | 10/1994 | Booher |
| 5,454,620 A | | 10/1995 | Hill et al. |
| 5,460,431 A | | 10/1995 | McWilliams |
| 5,509,724 A | * | 4/1996 | Perry et al. ............... 298/22 D |
| 5,758,927 A | * | 6/1998 | Koester ................... 298/22 AE |

* cited by examiner

Primary Examiner—Stephen T. Gordon
(74) Attorney, Agent, or Firm—Reising, Ethington, Barnes, Kisselle, Learman & McCulloch, P.C.

(57) ABSTRACT

The frameless end dump fifth wheel trailer includes a cargo container. A rear axle and wheels support the rear portion of the cargo container. A hydraulic cylinder is pivotally attached to the front portion of the container. A piston rod of the hydraulic cylinder is pivotally attached to a kingpin plate assembly. A kingpin is secured to the plate assembly. A tension frame assembly is pivotally attached to the plate assembly and to the rear portion of the container. Two mast members are secured to the plate assembly. A pair of kingpin plate control arms have forward ends each of which is pivotally attached to one of the masts and rear ends pivotally attached to the center portion of the cargo container. A flat bottom surface of the kingpin plate is held in a substantially horizontal position by the plate control arms.

11 Claims, 3 Drawing Sheets

END DUMP FIFTH WHEEL TRAILER

TECHNICAL FIELD

The end dump fifth wheel trailer is a frameless trailer with a stabilization system that holds the kingpin plate in a generally horizontal position.

BACKGROUND OF THE INVENTION

Fifth wheel trailers with end dumps have hydraulic cylinder lift systems for dumping bulk material from an open rear end gate. One of the two basic types of such trailers is referred to a frame-type trailer. The other type is referred to as a frameless-type trailer.

The frame-type end dump trailers have a trailer frame with a kingpin connectable to a fifth wheel that supports the forward end of the frame and wheels and axles that support the rear end of the frame. A cargo container is pivotally attached to the rear of the frame for pivotable movement about a horizontal axis that is transverse to the normal direction of trailer movement. At least one hydraulic cylinder is pivotally connected to the front of the frame and to the cargo container. Extension of the hydraulic cylinder pivots the cargo container about the axis of the pivot connection to the frame and lifts the front end of the cargo container relative to the trailer frame. The trailer frame remains generally horizontal and provides a somewhat stable platform for the cargo container. The trailer kingpin generally vertical and the kingpin plate which is fixed to the trailer frame and sets on the top surface of the fifth wheel remains generally horizontal. The kingpin permits pivotal movement of the trailer about a vertical axis relative to a tractor. A pivotal connection between the fifth wheel and the tractor frame permits the trailer frame to pivot about a transverse horizontal axis relative to the tractor. Without the transverse pivot connection between the fifth wheel and the tractor frame, there would be a tendency to lift the front steered wheels off the ground at times and to overload the steered wheels at other times when traveling on uneven road surfaces. This tendency to transfer weight between front and rear axles can result in tractor and trailer damage.

A major drawback of the frame-type end dump fifth wheel trailer is weight. The main frame has sufficient strength and material to support the entire weight of the cargo container and the cargo in the cargo container. When the front end of the cargo container is first raised by a hydraulic cylinder to dump cargo from the open rear end gate, the cargo container must have sufficient strength to support the weight of the cargo as well as the weight of the cargo container. The result is a trailer with excess weight and reduced cargo capacity.

The frameless-type trailer has a cargo container with rear support wheels connected directly to rear portion of the cargo container. A kingpin plate and a kingpin are pivotally attached to a hydraulic cylinder that lifts the cargo container to dump cargo. The kingpin is latched to a fifth wheel and the kingpin plate sits on the upper bearing surface of the fifth wheel. A pair of tension beams have forward ends pivotally attached to the kingpin plate and rear ends pivotally attached to a cargo container midway between the front end and the rear end of the frameless trailer. These tension beams transmit force from the kingpin to the trailer wheels to move the trailer forward and rearward. The beams also transmit force from the kingpin to the cargo container when the tractor brakes are applied.

The fifth wheel of a tractor is locked in place relative to the tractor frame when pulling a frameless trailer to hold the kingpin plate and the fifth wheel upper surface in a generally horizontal position. The pivot connection between the hydraulic cylinder, the right tension beam, and the left tension beam, and the kingpin plate all have transverse horizontal axes and permit the trailer to pivot about a transverse horizontal axis relative to the tractor when the fifth wheel is locked relative to the tractor frame.

Long cargo compartments of semi-trailers may become unstable when the cargo compartment is raised to a dump position. The maximum width of a trailer is 8.5 feet. The center of gravity prior to raising a cargo container loaded with sand or crushed rock is most likely about 7 feet above a tractor support surface. When the trailer cargo compartment is raised to a dump position the cargo in the front portion of the compartment is well over 20 feet above the trailer support surface and supported on a base that extends less than 8.5 feet in width. If the fifth wheel is not locked relative to the tractor frame, and the tractor is out of fore and aft alignment with the trailer, shifting of the unlocked fifth wheel, about the axis of its connection to the tractor frame, to a front stop or a rear stop will move the lower end of the hydraulic cylinder a few inches toward one side or the other of the trailer and may result in the trailer laying over on one side or the other. It is therefore necessary to ensure that the fifth wheel of a tractor is locked relative to the tractor frame to minimize the chance of tipping a frameless trailer on its side.

The attachment of a frame type end dump trailer or a standard cargo trailer to a tractor with a fifth wheel locked relative to the tractor frame may result in damage to the tractor frame, tractor axles, tires, wheels and suspension systems as well as to the trailer and the fifth wheel.

SUMMARY OF THE INVENTION

The end dump fifth wheel trailer has a cargo container. At least one axle with tires and wheels is secured to a rear portion of the cargo container. A kingpin is secured to a kingpin plate assembly. A hydraulic dump cylinder is pivotally attached to the cargo container and pivotally attached to the kingpin plate assembly. An elongated tension member is pivotally attached to the kingpin assembly for pivotal movement about a plate pivot pin axis and pivotally attached to the cargo container for pivotal movement about a first container pivot axis. A kingpin plate control arm has a forward end pivotally attached to the kingpin plate assembly for pivotal movement about a plate and control arm axis that is parallel to the plate pivot pin axis and spaced from the plate pivot pin axis. The kingpin plate is control arm also has a rear end pivotally attached to the cargo container for pivotal movement about a second container pivot axis that is parallel to and spaced from the first container pivot axis. The kingpin plate control arm holds a flat bottom surface of the kingpin plate assembly in a substantially horizontal position as the cargo container is moved by the hydraulic cylinder from a lowered position to a raised position.

BRIEF DESCRIPTION OF THE DRAWINGS

The presently preferred embodiment of the invention is disclosed in the following description and in the accompanying drawings, wherein.

DESCRIPTION OF THE PREFERRED EMBODIMENT

Figure 1:
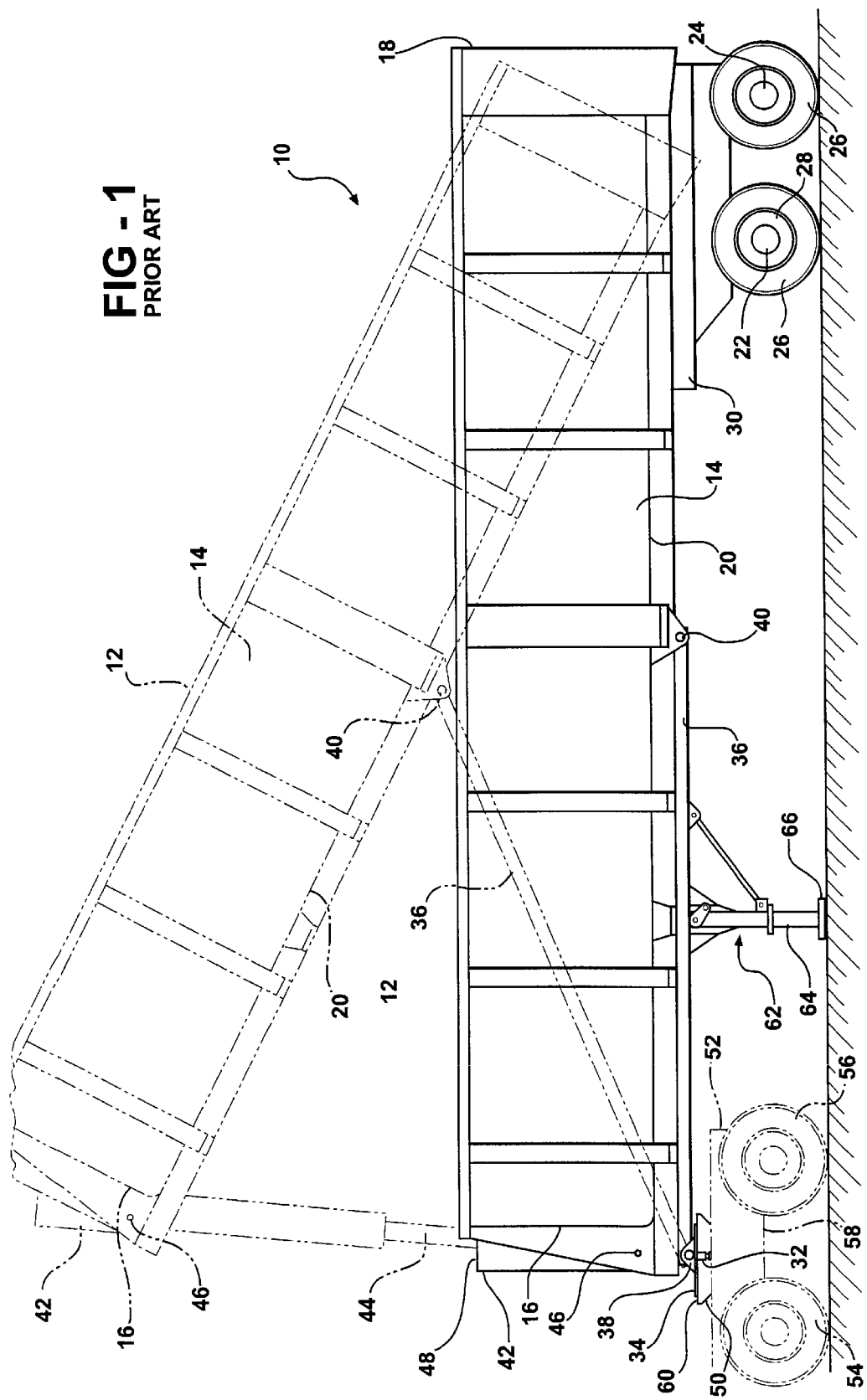
FIG. 1 is a side elevational view of a prior art frameless end dump trailer connected to a tractor in a lowered position and with the cargo compartment shown in a partially raised position in phantom lines.

The end dump fifth wheel trailer 10 shown in FIG. 1 is a prior art frameless trailer. The trailer 10 has a cargo container 12 with side walls 14, a front end 16, a rear end 18, and a floor 20. The rear end 18 includes an end gate (not shown) that is open to dump cargo from the container 12. Two rear axles 22 and 24 with attached tires 26 and wheels 28 support the rear end 18 of the cargo container 12. The axles 22 and 24 are attached to a subframe 30 by a suspension system (not shown). The subframe 30 is secured to the cargo container 12.

The front end 16 of the cargo container has a kingpin 32 and a kingpin plate 34. The kingpin plate 34 is pivotally attached to a pair of parallel tension beams 36 by pivot pins 38. The rear ends of the tension beams 36 are pivotally attached to the center portion of the cargo container by pivot pins 40. One of the tensioning beams 36 is connected to the cargo container 12 adjacent to the right side wall 14 while the other tensioning beam is attached to the cargo container adjacent to the left side wall. The piston rod 44 of a hydraulic cylinder 42 is pivotally attached to the kingpin plate 34 by a pivot pin that is coaxial with the pivot pins 38. A pair of trunnions 46 on the tubular casing 48 of the hydraulic cylinder 42 pivotally connect the hydraulic cylinder to the cargo container 12. When the multiple telescopic piston rods 44 are retracted, the cargo container 12 rests on the kingpin plate 34. This construction leaves the kingpin plate 34 free to pivot about the transverse horizontal axis of the pivot pins 38.

The kingpin 32 is connectable to the fifth wheel 50 of a tractor 52, with drive wheels 54 and 56. The fifth wheel 50 is locked to the frame 58 of the tractor 52 with its kingpin plate support surface 60 in a generally horizontal plane.

A trailer landing gear 62 with two extendible tubes 64 and landing gear pads 66 support the front portion of the cargo container 12 when the trailer 10 is not connected to a tractor 52. The frameless end dump fifth wheel trailer 68 shown in FIGS. 2 and 3 has a cargo container 70 with a floor 72, side walls 74, a front end wall 76 and a rear end wall 78. The rear end wall 78 is a dump gate or door. The construction of the dump door varies depending on the cargo that is to be transported.

Two axles 80 and 82 with tires 84 and wheels 86 are connected to a subframe 88 by a suspension system (not shown). The subframe 88 is rigidly secured to the rear portion of the cargo container 70 and supports the rear portion of the trailer 68. The rear axle 82 becomes the axis about which the cargo container 70 pivots when cargo is dumped from the rear. If desired, the cargo container 70 can be pivotally attached to the subframe 88. With a pivot connection between the subframe 88 and the cargo container 70, the axle 80 as well as the axle 82 support the rear portion of the trailer 68 during dumping of cargo.

The kingpin 90 and the kingpin plate assembly 92 are pivotally attached to a tension assembly 94 by coaxial pivot pins 96. These pivot pins 96 permit the tension frame 94 to pivot about a horizontal transverse axis relative to the kingpin plate 92. The pivot pins 96 also connect the tension frame 94 to the right end 98 and the left end 100 of the kingpin plate 92 for enhanced stability. The rear portions of the tension frame 94 are pivotally attached to the cargo container 70 by two spaced apart tension member pivot pins 102. These coaxial tension member pivot pins 102 are adjacent to opposite sides 74 of the trailer and forward of the rear axle 82. The tension frame 94 is strengthened by cross members 104. Some of the cross members 104 can be at an acute angle to the side beams 106 and 108, rather than normal to the side beams, to strengthen the tension frame 94.

Figure 2:
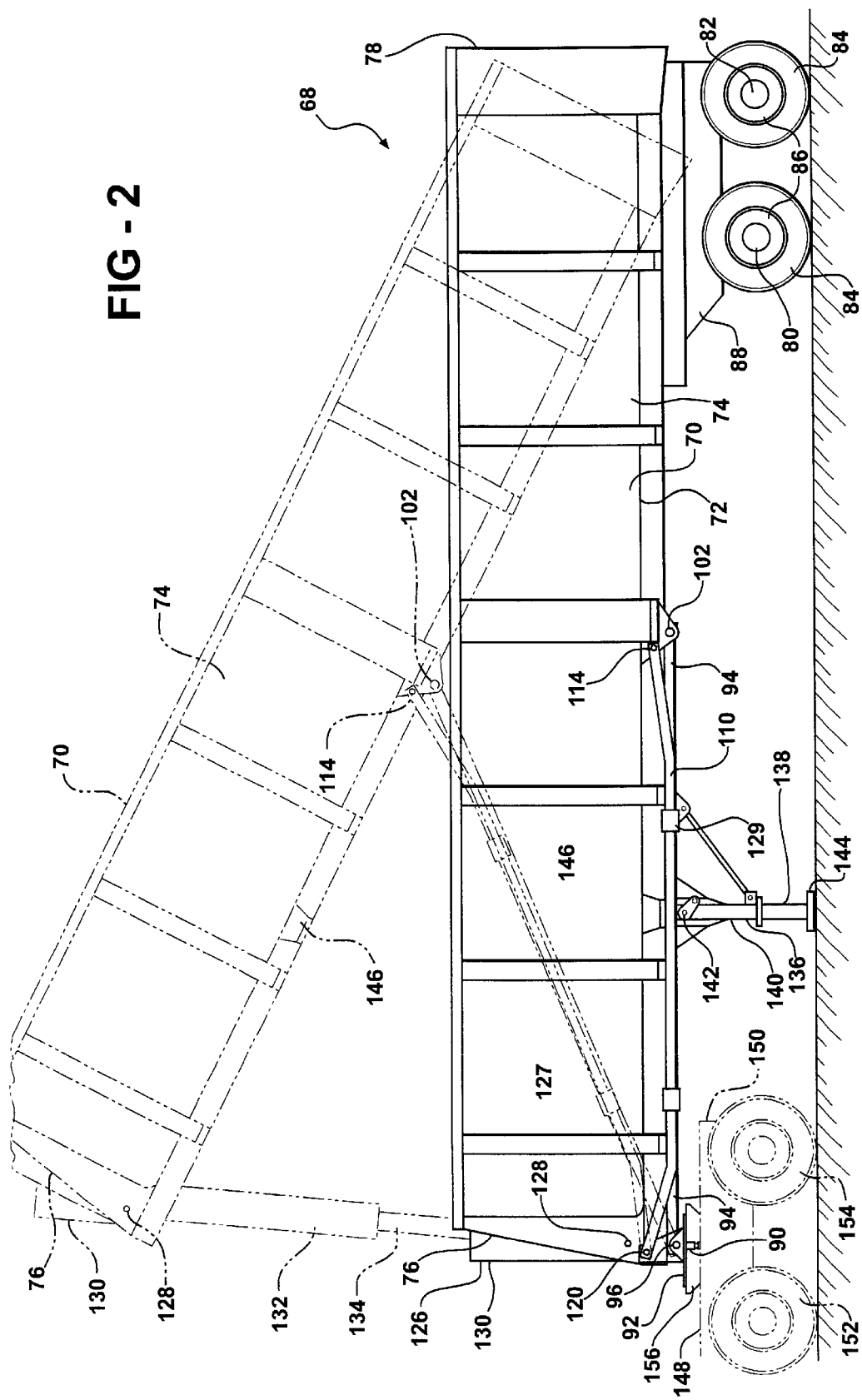
FIG. 2 is a side elevational view of the frameless end dump fifth wheel trailer of this invention shown in a lowered position and shown in phantom lines with a cargo compartment partially raised.
Figure 3:
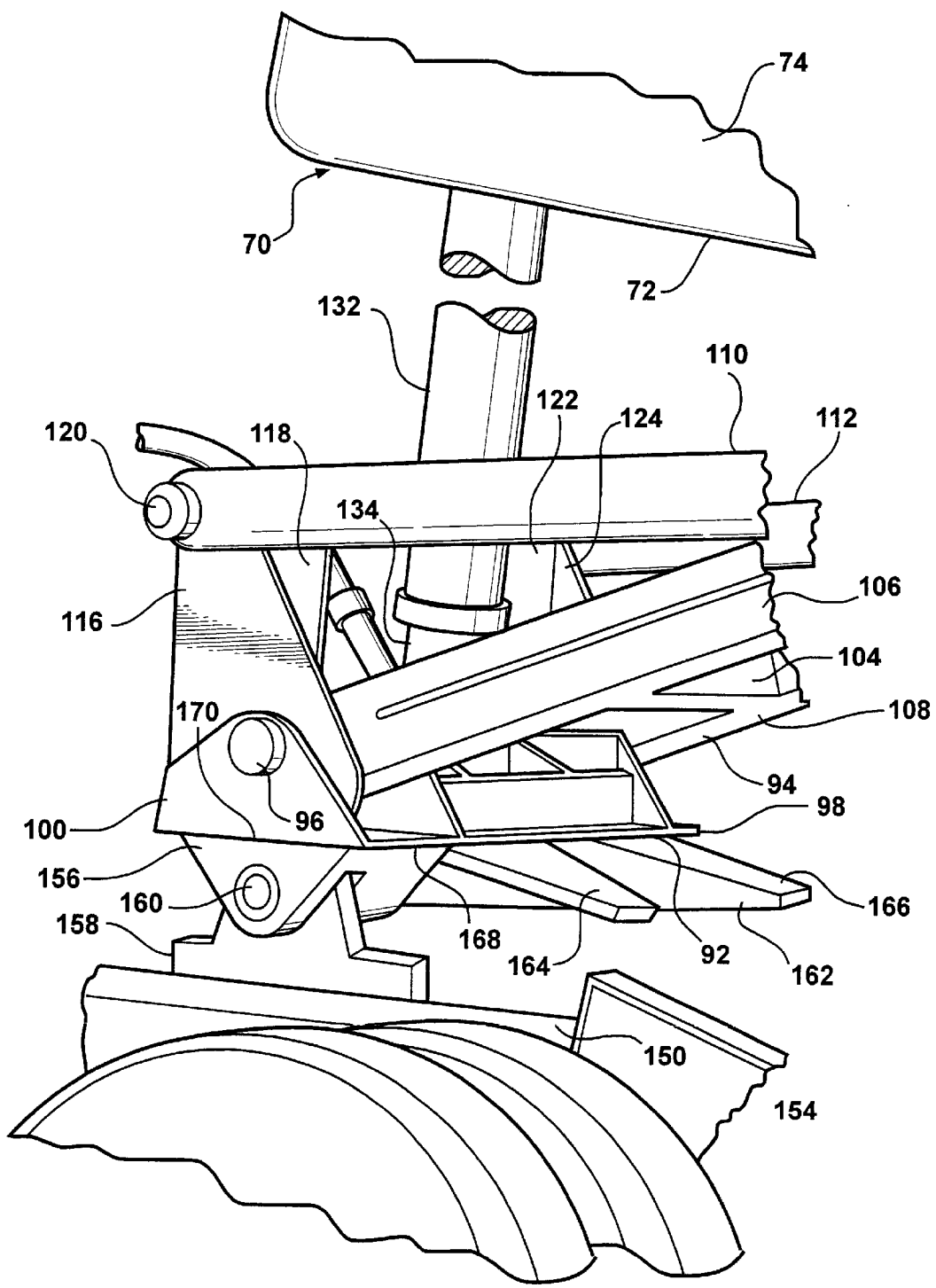
FIG. 3 is an enlarged perspective view of the connection of a frameless end dump fifth wheel trailer to a fifth wheel of a tractor with parts broken away.

Two kingpin plate control arms 110 and 112 are pivotally attached to the cargo container 70 by rear control arm pivot pins 114. These control arm pivot pins 114 are above and forward of the tension member pivot pins 102. The pins 114 are also parallel to the pins 102. The forward end of the control arm 110 is connected to mast arms 116 and 118 by a first pivot pin 120. The forward end of the control arm 112 is connected to the mast arms 122 and 124 by a second pivot pin 120. The mast arms 116, 118, 122 and 124 are welded to the kingpin plate assembly 92. The pivot pins 120 are coaxial with each other and parallel to the pivot pins 96. The pivot pins 120 are also above and forward of the pins 96 as shown in FIG. 2.

Guide sleeves 127 and 129, attached to both sides of the tension frame 94, receive and guide the kingpin plate control arms 110 and 112. These guide sleeves 127 and 129 permit sliding movement of the control arms 110 and 112 relative to the tension frame 94 while resisting excess vertical movement. The function of the guide sleeves 127 and 129 is to limit flexing of the control arms 110 and 112 caused by vibrations when the trailer 68 is moving upon a rough road surface.

A hydraulic cylinder 126 has trunnions 128 that pivotally attached the cylindrical housing 130 to the forward end of the cargo container 70. A multi-stage piston assembly 132 is received in the cylindrical housing 130. The inner piston rod 134 of the piston assembly 132 is pivotally attached to the kingpin plate assembly by a pin that is coaxial with the pin 96. If desired, one elongated pin 96 can pivotally attach both side beams 106 and 108 of the tension frame 94 as well as the inner piston rod 134 to the kingpin plate assembly 92.

The landing gear 136 includes a pair of tubular members 138 that are each telescopically received in a vertical tube 140 mounted on the tension frame assembly 94. A linear actuator assembly 142 advances and retracts the tubular members out of and into vertical tubes 140. Grounding engaging shoe plates 144 are connected to the bottoms of the tubular members 138. Pads 146 on the bottom on the cargo container 70 transfer weight from the cargo container 70 to the tension frame assembly 94 and to the landing gear 136 when the trailer 68 is disconnected from a tractor 148.

The tractor 148, as shown, has a frame 150 supported by driven rear axles, wheels and tires 152 and 154. A fifth wheel 156 is pivotally attached to blocks 158 by pins 160 for pivotal movement about a horizontal transverse axis. The blocks 158 are secured to opposite sides of the frame 150 of the tractor 148. These blocks 158 may be shifted in a fore and aft direction relative to the frame 150 to adjust axial loading on the tractor 148. The fifth wheel 156 has a kingpin guide slot 162 and ramp surfaces 164 and 166 to the sides of the guide slot 162. When the trailer 68 is connected to the tractor 148, the kingpin 90 is received in the guide slot 162 and the kingpin plate assembly 92 engages the ramp surfaces 164 and 166. Continued rearward movement of the tractor 148 slides the kingpin plate 92 up the ramp surfaces 164 and 166 until the kingpin 90 enters a kingpin pocket. The kingpin is then latched to the fifth wheel 156 by a latch assembly (not shown) that is provided by the manufacturer of the fifth wheel 156. When the kingpin 90 is latched to the fifth wheel 156, the flat bottom surface 168 of the kingpin plate assembly 92 is in contact with the flat top surface 170 of the fifth wheel 156 forward of the ramp surfaces 164 and 166. The top surface 170 of the fifth wheel 156 and the bottom surface 168 of the kingpin plate 92 are generally lubricated to facilitate pivotal movement of the fifth wheel about the vertical axis of the kingpin 90 during a change in the direction of travel of the tractor 148.

The forces exerted on the tractor frame 150 are substantially limited to forces that are normal to the axis of the pins 160 that pivotally attached the fifth wheel 156 to the tractor 148. Forces parallel to the axis of the pins 160 are usually quite small. However it is possible to exert a force in one direction on one of the two pins 160 and in the other direction on the other one of the two pins.

The tension frame assembly 94, the two kingpin plate controls arms 110 and 112, the mast arms 116 and 124 that fix the distance between the coaxial pivot pins 96 and the first and second pivot pins 120, and the portions of the cargo container that fix the positions of the tension member pivot pins 102 relative to the rear control arm pivot pins 114 form a 4-bar linkage when connected together by pins 96, 120, 102 and 114. The 4-bar linkage would be a pantographic linkage if the distance between pin 96 and pin 120 was equal to the distance between pivot pin 102 and pivot pin 114 and the length of the tension frame assembly 94 was equal to the length of the control arms 110 and 112. The 4-bar linkage as shown in FIG. 2 is a modified pantographic linkage in that pins 120 are spaced from pins 96 a distance that is greater than the distance between the pin 102 and the pin 114.

The purpose of the 4-bar linkage described above is to hold the flat bottom surface 168 of the kingpin plate assembly 92 in a substantially horizontal position as the cargo container 70 is pivoted about the rear axle 82 by the hydraulic cylinder 126 from a horizontal position to a fully raised position. Because the pins 114 and 102 move in an arc about the rear axle 82 as the cargo container 70 is raised to a dump position by the hydraulic cylinder 126, the 4-bar linkage must be a modified pantographic linkage. Shortening the distance between the pin 102 and the pin 114 relative to the distance between the pins 96 and 120 holds the bottom surface 168 in a substantially horizontal plane during extension and retraction of the hydraulic cylinder 126. The load on plate control arms 110 and 112 required to maintain the bottom surface 168 of the kingpin plate 92 in a substantially horizontal position is minimized by separating the pin 120 from the pin 96 and applying force to the pin 120 along a line that is close to perpendicular to the line passing through the axis of the pin 120 and the axis of the pin 96. By positioning the pins 120 a short distance forward of the pins 96, force exerted by the control arms 110 and 112 is perpendicular to a plane containing the axes of the pin 120 and the pin 96 when the hydraulic cylinder 126 is partially extended. Deviation of the line of force through the pin 114 and the pin 120 from perpendicular to a plane containing the axes of the pin 120 and the axis of the pin 96 is minimized when the hydraulic cylinder 126 is fully retracted as well as when the hydraulic cylinder is fully extended. When the four axes of four pins are a pantographic linkage are in one common plane, the pins are not retained in the plane by the linkages.

The pin 96, which connects the inner piston rod 134 to the kingpin plate assembly, is above and parallel to the pins 160 that connect the fifth wheel 156 to the tractor frame 150. As a result the hydraulic cylinder 126 exerts force on the kingpin plate 92 that generally urges the kingpin plate and a connected fifth wheel 156 to rotate about pins 160. The kingpin plate control arms 110 and 112 prevent pivotal movement of the kingpin plate 92 due to force exerted on the plate by the hydraulic cylinder 126.

Kingpin plate positioning bars (not shown) position the kingpin plate 92 relative to the cargo container 70 when the hydraulic cylinder 126 is retracted. Stop bars (not shown) limit downward movement of the cargo container 70 relative to the kingpin plate 92 and transfer cargo weight to the kingpin plate when the hydraulic cylinder 126 is retracted. These positioning bars and stop bars unload the hydraulic cylinder 126 and the kingpin plate control arms 110 and 112 during transport of cargo. The positioning bars and the stop bars have been removed from the drawing to reduce confusion and to more clearly show the invention.

The disclosed embodiment is representative of a presently preferred form of the invention, but is intended to be illustrative rather than definitive thereof. The invention is defined in the claims.

We claim:

1. An end dump fifth wheel trailer comprising:
   a cargo container;
   at least one axle with tires and wheels secured to a rear portion of said cargo container;
   a kingpin secured to a kingpin plate assembly;
   a hydraulic dump cylinder pivotally attached to said cargo container and pivotally attached to the kingpin plate assembly;
   an elongated tension member pivotally attached to the kingpin plate assembly for pivotal movement about a plate pivot pin axis and pivotally attached to said cargo container for pivotal movement about a first container pivot axis;
   a kingpin plate control arm having a forward end pivotally attached to the kingpin plate assembly for pivotal movement about a plate and control arm axis that is parallel to the plate pivot pin axis and spaced from the plate pivot pin axis and having a rear end pivotally attached to said cargo container for pivotal movement about a second container pivot axis that is parallel to and spaced from the first container pivot axis; and
   wherein the kingpin plate control arm holds a flat bottom surface of the kingpin plate assembly in a substantially horizontal position as the cargo container is moved by the hydraulic cylinder from a lowered position to a raised position.

2. An end dump fifth wheel trailer, as set forth in claim 1, including a landing gear assembly mounted on the elongated tension member.

3. An end dump fifth wheel trailer, as set forth in claim 2, including at least one pad mounted on said cargo container that transfers weight from said cargo container to the landing gear assembly when a forward portion of said cargo container is supported by the landing gear assembly.

4. An end dump fifth wheel trailer, as set forth in claim 1, including at least one guide sleeve mounted on the elongated tension member that guides and supports the kingpin plate control arm.

5. An end dump fifth wheel trailer, as set forth in claim 1, including a second kingpin plate control arm that is laterally spaced from the kingpin plate control arm, has a second control arm forward end attached to the kingpin plate assembly for pivotal movement about the plate and control arm axis and has a second control arm rear end pivotally attached to said cargo container for pivotal movement about the second container pivot axis.

6. An end dump fifth wheel trailer, as set forth in claim 1, wherein the elongated tension member and the kingpin plate control arm are substantially the same length.

7. An end dump fifth wheel trailer comprising:
   a cargo container having a floor, side walls, a front end wall and a rear gate;
   a plurality of axles with tire and wheels secured to a rear portion of said cargo container and supporting the rear portion of said cargo container;
   a kingpin secured to a kingpin plate assembly;
   a generally vertical hydraulic dump cylinder pivotally attached to a front portion of said cargo container and pivotally attached to the kingpin plate assembly;
   an elongated tension frame pivotally attached to the kingpin plate assembly for pivotal movement about a first transverse horizontal plate pivot pin with a plate pivot pin axis and pivotally attached to a center portion of the cargo container for pivotal movement about a first transverse horizontal container pivot axis;
   a generally vertical left side mast attached to the kingpin plate assembly;
   a generally vertical right side mast attached to the kingpin plate assembly;
   a left side kingpin plate control arm pivotally attached to an upper end of the generally vertical left side mast for pivotal movement about a mast axis that is above the plate pivot pin axis and pivotally attached to the center portion of the cargo container for pivotal movement about a second container pivot axis that is parallel to and spaced from the first transverse horizontal container pivot axis;
   a right side kingpin plate control arm pivotally attached to an upper end of the generally vertical right side mast for pivotal movement about the mast axis and pivotally attached to the center portion of said cargo container for pivotal movement about a second container pivot axis; and
   wherein the left and right side kingpin plate control arms hold a flat bottom surface of the kingpin plate assembly in a substantially horizontal position as said cargo container is moved by the hydraulic cylinder from a lowered position with the hydraulic cylinder retracted to a raised position with the hydraulic cylinder extended.

8. An end dump fifth wheel trailer, as set forth in claim 7, wherein the elongated tension frame is substantially the same length as the left side kingpin plate control arm and the right side kingpin plate control arm.

9. An end dump fifth wheel trailer, as set forth in claim 7, including a landing gear mounted on the elongated tension frame.

10. An end dump fifth wheel trailer, as set forth in claim 9, including a pair of cargo container pads mounted on said cargo container that transfer weight from said cargo container to the landing gear when a forward portion of said cargo container is supported by the landing gear.

11. An end dump fifth wheel trailer, as set forth in claim 10, wherein the pair of cargo container pads contact the elongated tension frame and weight is transferred to the landing gear through the elongated tension frame.

* * * * *